(No Model.) 2 Sheets—Sheet 1.

J. E. STANNARD.
ELECTRICALLY CONTROLLED CLUTCH MECHANISM.

No. 550,298. Patented Nov. 26, 1895.

WITNESSES:
H. C. Fronk.
J. E. Chapman

INVENTOR
J. E. Stannard
BY
Wm. T. Chapman
ATTORNEY.

(No Model.) 2 Sheets—Sheet 2.
J. E. STANNARD.
ELECTRICALLY CONTROLLED CLUTCH MECHANISM.
No. 550,298. Patented Nov. 26, 1895.
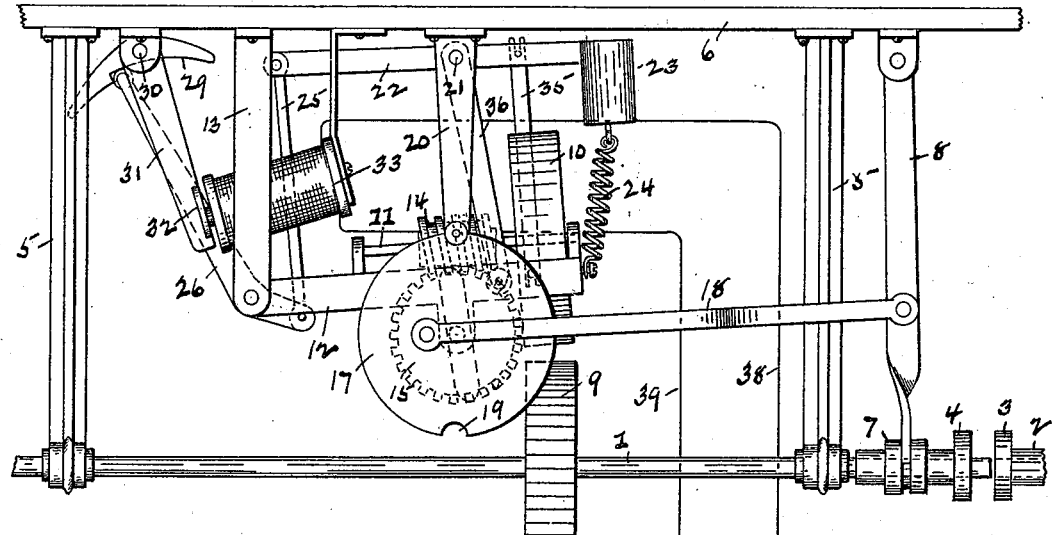
Fig. 3.
Fig. 4.
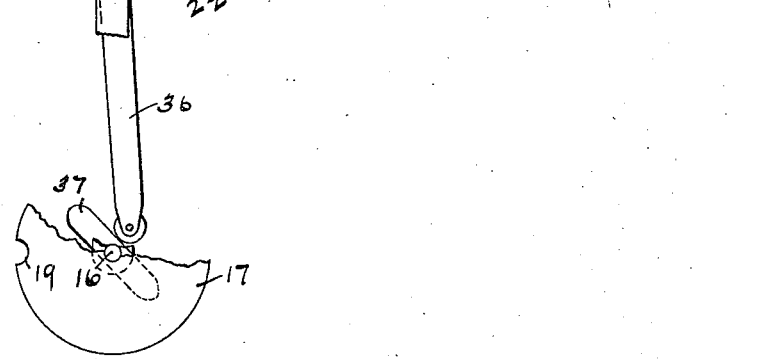
WITNESSES:
INVENTOR
J. E. Stannard
BY
Wm. T. Chapman
ATTORNEY.

UNITED STATES PATENT OFFICE.

JOHN E. STANNARD, OF SPRINGFIELD, MASSACHUSETTS.

ELECTRICALLY-CONTROLLED CLUTCH MECHANISM.

SPECIFICATION forming part of Letters Patent No. 550,298, dated November 26, 1895.

Application filed April 5, 1895. Serial No. 544,559. (No model.)

*To all whom it may concern:*

Be it known that I, JOHN E. STANNARD, a citizen of the United States, residing at Springfield, in the county of Hampden and State of Massachusetts, have invented a new and useful Electrically-Controlled Clutch Mechanism, of which the following is a specification, reference being had to the accompanying drawings, forming part thereof.

My invention relates to the operation of clutches connecting power-shafts with their driven shafts; and it has for its objects to provide an automatic clutch mechanism in which the movement of the power-shaft itself is utilized to cause the movement of the movable member of the clutch in both directions, and to combine with such mechanism means for electrically controlling the connection between the clutch-moving devices and the power-shaft in such manner that such connection can be caused by pressing a button located at any point in the line of the electrical connections.

To these ends my invention consists in the clutch-operating mechanism constructed and operating as hereinafter fully described, and particularly pointed out in the claims.

Figure 1:
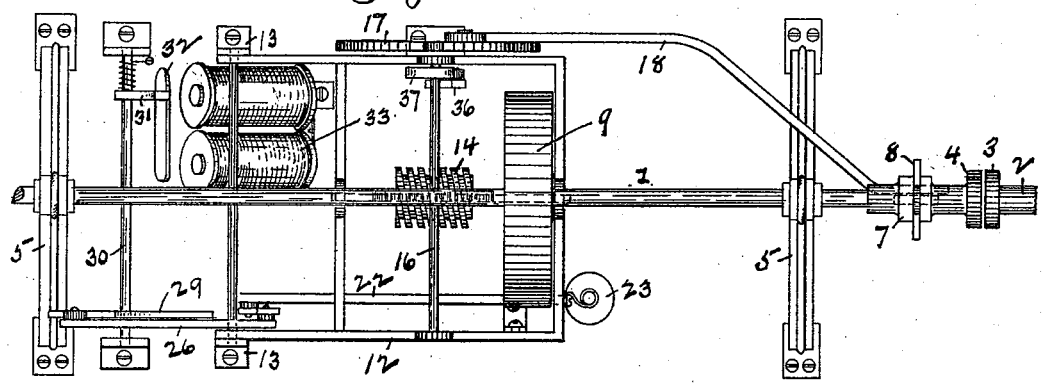
Figure 2:
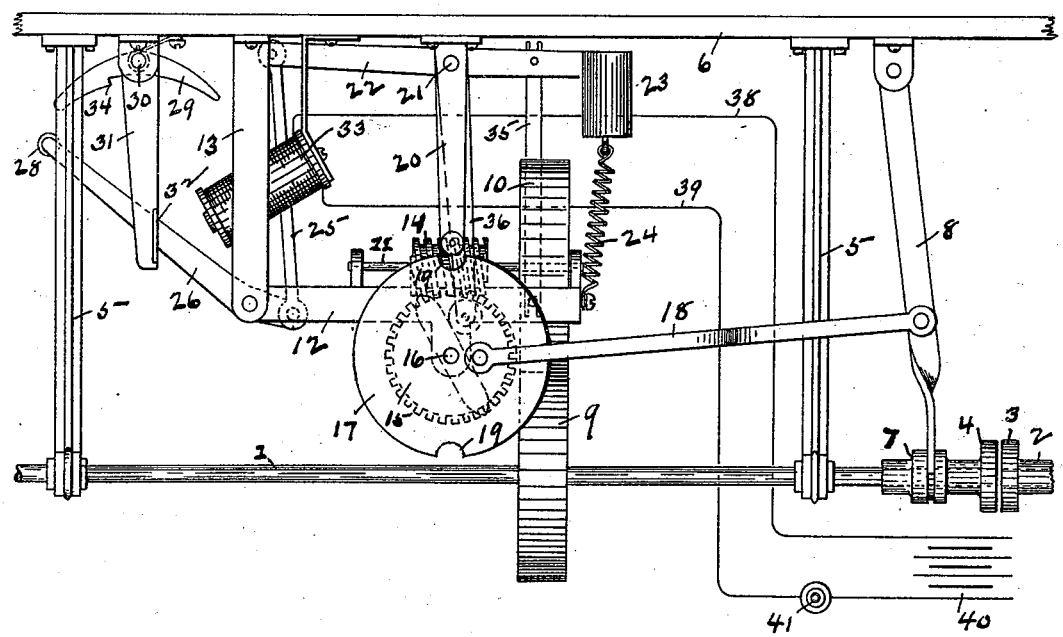

Referring to the drawings, in which like numerals designate like parts in the several views, Figure 1 is a reverse plan view of a clutch-operating mechanism embodying the invention. Fig. 2 is a side elevation thereof. Fig. 3 is a similar view showing the parts in their opposite position. Fig. 4 is a detail view showing the cam which restores the parts to their working position and the lever operated thereby.

The numeral 1 designates the power-shaft, which may be any shaft from which it is desired to transmit motion to a driven shaft located in line therewith. 2 designates such driven shaft. 3 designates the fixed clutch member carried by said shaft 2, and 4 designates the movable clutch member carried by said power-shaft. As herein shown, said clutch members consist of two disks adapted to have a frictional engagement with each other; but it will be understood that they are shown as one example merely of the various forms of clutches and that my invention is applicable to any form of clutch in which one member is engaged with and disengaged from the opposite member by movement parallel with the axes of the two shafts carrying said members. Said shafts are supported by suitable hangers 5, depending from the overhead support 6 in the usual manner, and the clutch member 4 carries a grooved collar 7, which is engaged by a depending clutch-lever 8 in a familiar manner, whereby movement of said lever will be imparted to said clutch member without interfering with the rotation of the latter. The power-shaft carries a wheel 9, preferably made of wood or otherwise having its periphery adapted for frictional engagement with a similar wheel 10, mounted upon a shaft 11, suitably journaled upon a frame 12, which is pivotally supported at one end by depending hangers 13, whereby said frame is capable of a limited vertical movement to move its wheel 10 into and out of engagement with the wheel 9. The shaft 11 also carries a worm 14, which meshes with a worm-gear 15, mounted upon a shaft 16, extending transversely across the frame 12 and suitably journaled thereon. Said shaft 16 carries at one end the crank-wheel 17, the crank-pin of which is connected to the clutch-lever 8 by a link 18, the parts being so proportioned that a half-revolution of the crank-wheel will move said lever and the clutch member 4 from one of their extreme positions to the other. Said crank-wheel has in its periphery two recesses or depressions 19 at diametrically-opposite points thereof and at an angle of ninety degrees to the crank-pin, which recesses, in the highest position of the frame 12, are adapted to receive an antifriction-roll at the lower end of a depending arm 20, the latter thus constituting a fixed stop to prevent rotation of the crank-wheel during the periods of rest of the movable clutch member in either of its positions. Upon a transverse shaft 21 is secured a lever 22, carrying at one end a weight 23 and connected at that end with the free end of frame 12 by a spring 24, while at its opposite end said lever is connected by a link 25 to the short arm of a lever 26, loosely hung upon the crossshaft 27 of frame 12. The long arm of said lever 26 extends upwardly and carries an antifriction-roll 28, which is adapted to engage the under side of a rocker-arm 29, mounted upon a transverse shaft 30, which shaft also carries an arm 31, upon which is located an armature 32, adapted for co-operation with an electromagnet 33 to normally retain the rocker-arm 29 in a position in which a shoulder 34 thereon engages the roll 28 and retains the lever 26 in the position shown in Fig. 3. A rod 35 extends between the weighted end of lever 22 and the free end of frame 12, by means of which the downward movement of the former is transmitted to the latter, said rod being slotted at one or both ends, as shown, to permit a limited amount of lost motion between said parts in the upward movement of the frame, as will be presently described.

To the shaft 21 is secured a second arm or lever 36, which projects downwardly and carries at its lower end an antifriction-roll, which is engaged by a cam 37 on the shaft 16.

Wires 38 39 leading to a battery 40 form a normally-closed circuit through the magnet 33 and its armature, said wires being led to any portions of the building in which the power-shaft is located from which it is desired to operate the clutch, and one or more push-buttons 41 serve to break the circuit at such points.

The operation of the clutch mechanism thus constructed is as follows: Assuming the parts to be in the position shown in Fig. 3, in which the clutch member 4 occupies its disengaged position and the wheel 10 is held out of engagement with wheel 9 by the action of the shoulder on rocker-arm 29 on the lever 26, if the push-button 41 be pressed the circuit through the magnet 33 will be broken, thereby permitting the arm 31, carrying the armature, to swing to a vertical position. Such movement of said arm swings rocker-arm 29 and disengages its shoulder from lever 26, whereupon the weighted end of lever 22 drops and through the rod 35 depresses the frame 12 to carry wheel 10 into contact with wheel 9 on the power-shaft, which movement also causes the recess 19 in the crank-wheel 17 to clear the roll at the lower end of the fixed arm 20. The movement transmitted to wheel 10 from wheel 9 and from the former wheel to crank-wheel 17 through shaft 11, worm 14, worm-gear 15, and shaft 16 is imparted to clutch-lever 8 through crank-rod 18, and the clutch member 4 commences its movement toward the clutch member 3. The motion of shaft 16 soon carries the cam 37 into engagement with the lower end of lever 36 and by swinging said lever turns shaft 21 to carry the weighted end of lever 22 back to its highest position, the depression of its opposite end depressing the short arm of lever 26 through link 25 and causing the long arm of said lever to swing upwardly until it engages the curved under side of rocker-arm 29 and moves the latter, shaft 30, and arm 31 to carry the armature back into the field of the magnet, thus resetting said parts in their normal position. The frame 12, however, is prevented from rising by the contact of the roll on the arm 20 with the periphery of the crank-wheel until the opposite recess 19 is brought into alignment therewith, at which time the clutch member 4 reaches its position of operative engagement with clutch member 3, whereupon spring 24 raises said frame to its highest position, thereby disengaging wheel 10 from wheel 9 and restoring all of the parts to the position shown in Fig. 3, but with the clutch in its locked position. The mechanism is now ready to be again operated by pressing a push-button to disengage the clutch, Fig. 2 showing the position of the parts immediately after the breaking of the circuit and as they are about to begin their operation of moving the clutch member 4 back to the position shown in Fig. 3. The lost motion previously referred to between lever 22 and the frame 12, secured by the rod 35, enables the weighted end of said lever to resume its highest position before said frame is released, as just described. The cam 37 being a two-part cam, as shown in Fig. 4, repeats its action during each half-revolution of shaft 16.

It will be observed that the motion of the power-shaft is utilized not only to move the clutch member in both directions but also to reset the parts after one operation in position for a new operation, thus rendering the mechanism entirely automatic in its action. The very great leverage obtained through arm 31, rocker-arm 29, lever 26, link 25, and lever 22 enables me to electrically maintain the parts in the position shown in Fig. 3 with a comparatively light battery, and I therefore prefer to use a closed circuit, as herein described, as I thereby lessen the possibility of failure of the mechanism to operate because of inattention to the renewal of the battery. It will be obvious to persons skilled in the art, however, that the mechanism herein shown and described can be readily adapted in a variety of ways for operation with a normally-open circuit instead of a closed one.

By means of the mechanism herein shown and described power-shafts of all kinds can be clutched to and unclutched from their driven shafts by simply pressing a button and at any desired points adjacent to or remote from the shafts themselves, thereby effecting a material saving in the time and trouble usually incident to such operations. It furthermore affords a quick means of stopping the motion of machinery in case of accident or other emergency.

Various modifications in the details of construction herein shown and described can be made without departure from the spirit of my invention.

Having thus fully described my invention, what I claim, and desire to secure by Letters Patent, is—

1. The combination with a power-shaft, a driven shaft, and a clutch for connecting said shafts together, of a pivotally supported frame carrying a crank-shaft and means for operatively engaging the power-shaft to transmit the motion of the latter to said crank-shaft, electrically controlled means for normally retaining the engaging means on said frame out of engagement with the power-shaft, and intermediate connections substantially as described between said crank-shaft and the movable member of said clutch, substantially as set forth.

2. A power-shaft, a driven shaft, a two-part clutch for coupling said shafts together, a crank-shaft having its crank operatively connected with the movable member of said clutch, electrically controlled means for transmitting motion from the power-shaft to said crank-shaft, and means for automatically stopping the motion of the crank-shaft when it has made a half-revolution, combined and operating substantially as described.

3. A power-shaft carrying a wheel, a driven shaft, a two-part clutch for coupling said shafts together, a frame pivotally supported above said power-shaft and carrying a worm-shaft provided with a wheel to engage the wheel on the power-shaft in the lowermost position of said frame, a crank-shaft mounted upon said frame and carrying a worm-gear which engages the worm on said worm-shaft, said shaft having its crank operatively connected with the movable member of said clutch, a lever operatively connected with said frame for imparting vertical movement thereto, a detent for normally causing said lever to retain the frame in its highest position, an electro-magnet and armature for governing the position of said detent, a battery electrically connected with said magnet, and means, as a push-button, for breaking and closing the circuit between said battery and magnet, combined and operating substantially as set forth.

4. The combination with the power-shaft, the driven shaft, and their connecting clutch, of the frame pivotally supported at one end and carrying the worm-shaft adapted to operatively engage the power-shaft in the lowest position of said frame, the crank-shaft driven by said worm-shaft and having its crank operatively connected with said clutch, the weighted lever having a yielding connection with said frame, the depending arm and cam on said crank-shaft for actuating said lever in one direction, the trip-lever having a link connection with said weighted lever, the rocker-arm provided with a shoulder to engage said trip-lever, and the electro-magnet and armature for controlling the action of said rocker-arm, substantially as set forth.

5. The combination with the power-shaft 1 carrying the wheel 9 and the movable clutch-member 4, of frame 12, shafts 11 and 16 journaled on said frame the former carrying wheel 10 and worm 14 and the latter carrying worm-gear 15 and crank-wheel 17 provided with the recesses 19, the fixed stop 20, and a connection between the crank on said crank-wheel and said clutch-member 4, substantially as set forth.

6. The combination with shaft 1 carrying wheel 9 and the clutch-member 4, of frame 12, shafts 11 and 16 journaled on said frame the former carrying wheel 10 and worm 14 and the latter carrying worm-gear 15 and crank-wheel 17, intermediate connections between said crank-wheel and the clutch-member 4, lever 22 carrying weight 23, spring 24 connecting said lever to the frame, rod 35, link 25, lever 26, shaft 30 carrying rocker-arm 29 and arm 31 provided with armature 32, electro-magnet 33, a battery, and electrical connections between it and said magnet, substantially as described.

7. The combination with shaft 1 carrying wheel 9 and clutch-member 4, of clutch-lever 8, frame 12, shafts 11 and 16 mounted upon said frame the former carrying wheel 10 and worm 14 and the latter carrying worm-gear 15, cam 37, and crank-wheel 17, crank-rod 18 connecting the crank on said wheel to said clutch-lever, levers 22 and 36, link 25, lever 26, shaft 30 carrying rocker-arm 29 and arm 31 provided with armature 32, magnet 33, battery 40, wires 38 39, push-button 41, and spring 24 connecting lever 22 with frame 12, substantially as set forth.

JOHN E. STANNARD.

Witnesses:
W. H. CHAPMAN,
J. E. CHAPMAN.